Patented Sept. 13, 1938

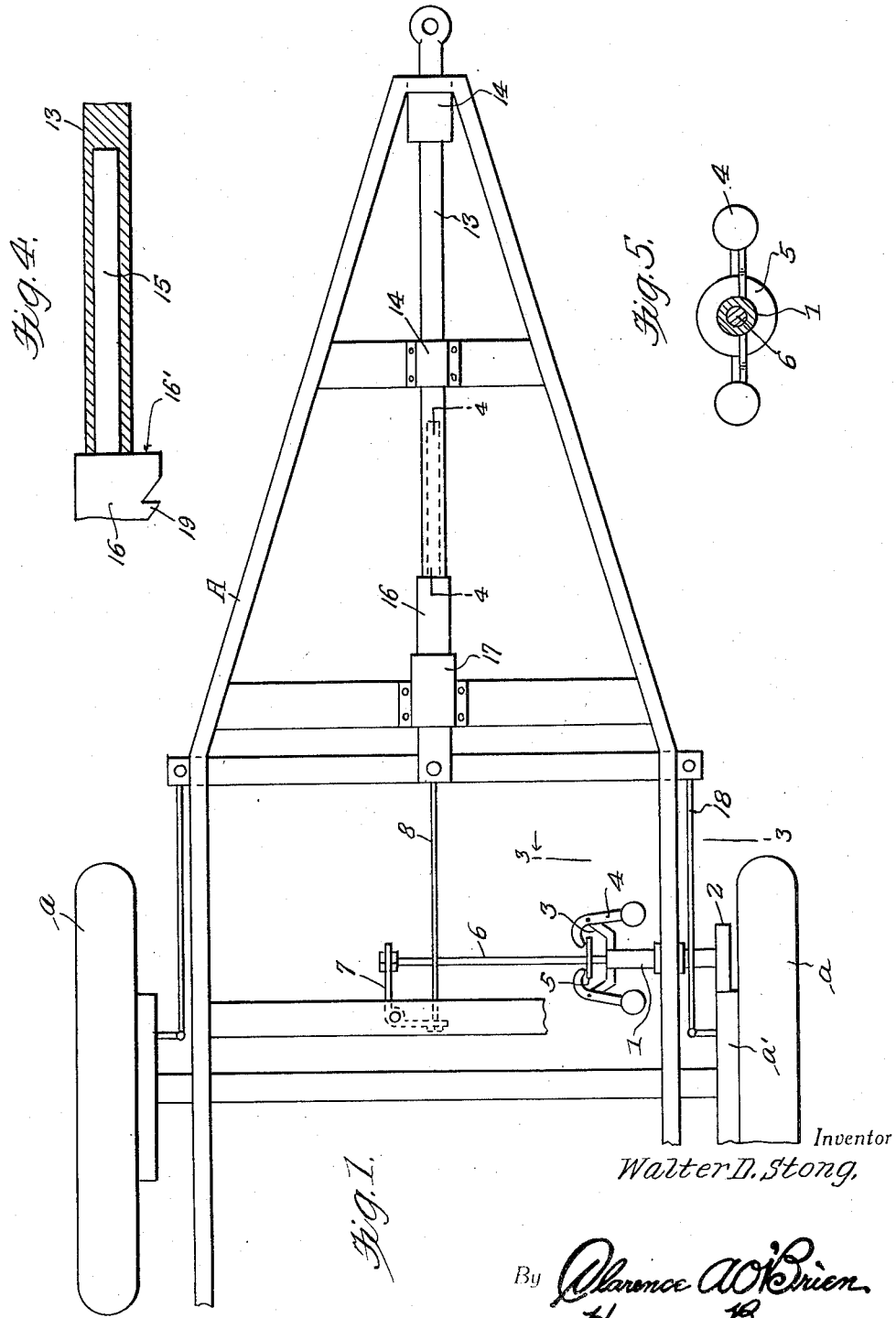

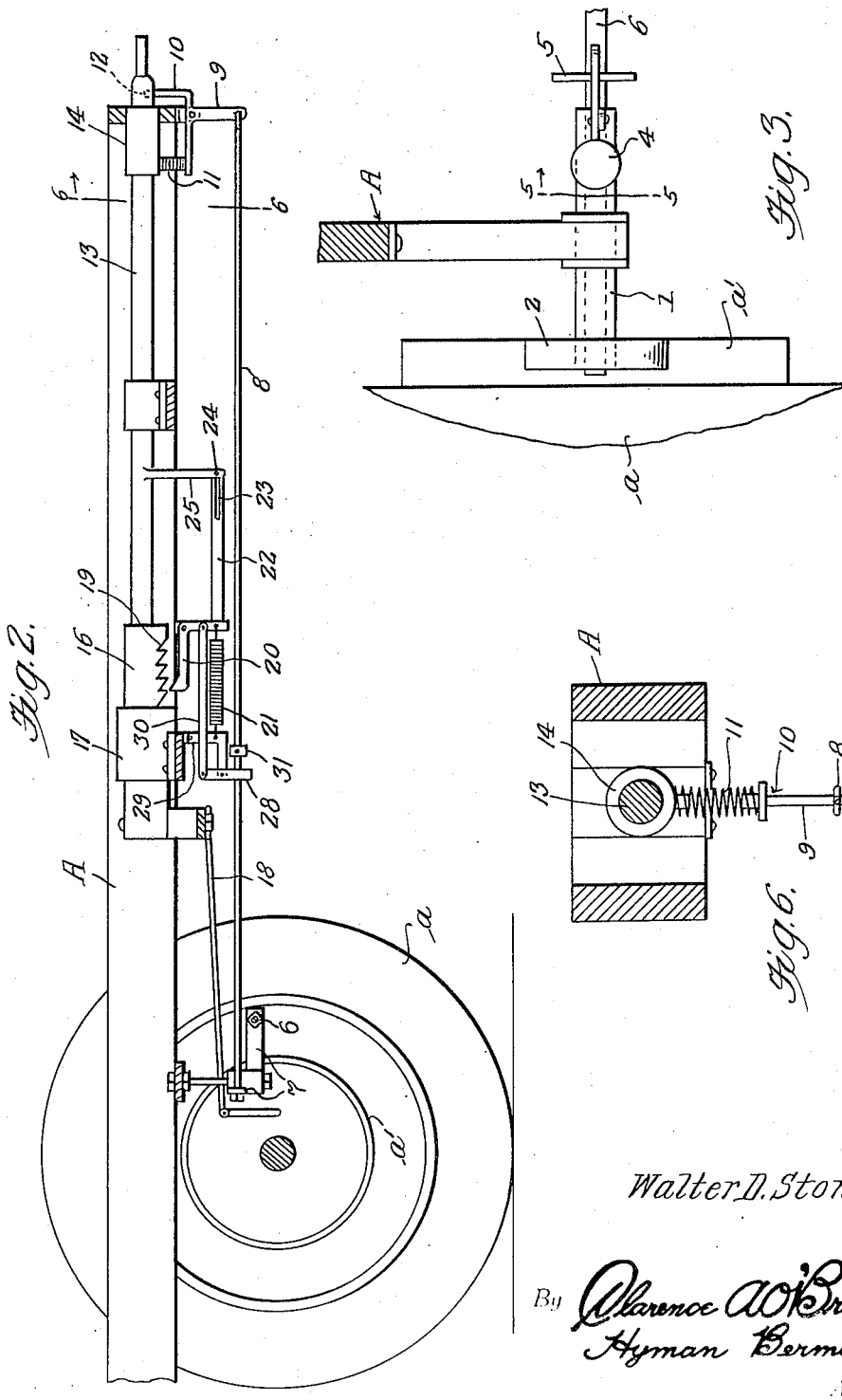

2,129,715

UNITED STATES PATENT OFFICE 2,129,715

AUTOMATIC TRAILER BRAKE CONTROL

Walter David Stong, Flint, Mich.

Application September 21, 1937, Serial No. 164,931

5 Claims. (Cl. 188—112)

This invention relates to means for controlling the brakes of a trailer when connected with a motor vehicle or other towing vehicle, the general object of the invention being to provide a latch member for normally holding the parts in a position with the brakes released, governor means operated by a rotating part of the trailer for releasing said member, means for applying the brakes of the trailer when the same moves toward the motor vehicle and means for holding the brakes applied when the parts are in a certain position, such as when the vehicles are moving down a grade and the trailer is crowding the motor vehicle.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a top plan view of the front portion of the chassis of a trailer, equipped with my invention.

Figure 2 is a longitudinal sectional view through Figure 1.

Figure 3 is a section on the line 3—3 of Figure 1.

Figure 4 is a section on the line 4—4 of Figure 1.

Figure 5 is a section on the line 5—5 of Figure 3.

Figure 6 is a section on the line 6—6 of Figure 2.

In these drawings, the letter A indicates the front portion of the chassis of a trailer, the front wheels being shown at a and the brake drums of these wheels are shown at a'.

In carrying out my invention I provide a tubular shaft 1 which is rotatably supported in transverse position by one of the side bars of the chassis and the outer end of this shaft has a wheel 2 connected therewith which contacts one of the brake drums a' so that the shaft is rotated when the vehicle is in motion. A bracket 3 is attached to the inner end of the shaft and carries the weighted governor arms 4 the inner ends of which are curved inwardly to engage a disk 5 attached to a rod 6 which has a portion slidably supported in the shaft 1. Thus when the vehicle is moving the governor will move the rod 6 longitudinally so that the rod will cause movement of a bellcrank 7 pivoted to a part of the chassis and this movement of the bellcrank will be communicated to a rod 8 which is connected to an arm 9 of an angle latch 10 which is normally held by a spring 11 in engagement with a keeper recess 12 formed in the tongue 13 of the trailer and which is adapted to be connected to the towing vehicle. This tongue is slidably supported in the front end of the trailer by the parts 14 and it has a socket in its rear end for slidingly receiving the reduced part 15 of the sliding member 16 which is supported for sliding movement in the member 17 attached to a part of the chassis. The member 16 is connected in any suitable manner with the brakes of the trailer as shown generally at 18 and in such a manner that as the member 16 is either moved rearwardly or is held against movement while the trailer moves forwardly the brakes will be applied. This member 16 has ratchet teeth 19 on its underside which are adapted to be engaged by a dog 20 pivotally supported on a part of the chassis and operated by a spring 21 which tends to hold the dog in engagement with the teeth. A link 22 is connected with the dog and has a slot 23 therein for receiving a pin 24 on a hanger 25 depending from the tongue 13.

A small lever 28 is pivoted to the bracket 29 supported from the chassis and to which the rear end of the spring 21 is connected. The lower part of the lever has a hole therein through which the rod 8 passes and a link 30 connects the upper end of the lever with the latch 20. A collar 31 is adjustably connected to the rod 8 in such a position that as the rod is moved rearwardly by the operation of the governor said collar will engage the lever so as to rock the same on its pivot which will cause the link 30 to move the latch 20 to releasing position from a tooth 19 of the member 16.

When the parts are so arranged that the latch 10 is engaging the keeper recess 12 in the tongue 13 the pin 24 will be in a position holding the link 22 with the dog 20 out of engagement with the teeth of the member 16 so that the springs of the brakes of the trailer will hold said brakes in released position. Thus the motor vehicle can pull the trailer and then when the speed of the trailer reaches a certain point, say two or three miles per hour, the governor will actuate the parts so as to release the latch 10 from the keeper recess 12 and then the parts will be ready for the application of the trailer brakes when necessary.

If the trailer should move toward the motor vehicle, for any reason, such as sudden stoppage of the motor vehicle or when the motor vehicle and the trailer are traveling down a grade the shoulder 16' formed at the junction of the reduced part 15 with the member 16 will engage the rear end of the tongue, which is held against sliding movement by being connected with the motor vehicle, and thus further movement of the member 16 will be stopped and as the trailer continues toward the motor vehicle the relatively stationary member 16 will cause the brakes of the trailer to be applied. However, as soon as the vehicle moves forwardly of the trailer a pull will be exerted upon the tongue which will then make the member 16 free to move so that the springs of the brakes will release the same.

In going down a grade the trailer will crowd the motor vehicle and to prevent the continual application of the brakes and the release of the brakes on a down grade, I provide the ratchet means including the teeth 19, the lever 28, and the dog 20. Thus when the brakes are applied on going down a grade and the vehicles are traveling at such a slow speed that the governor will not actuate the rod 8 and the tongue 13 is in a position, with the recess 12 out of alignment with the latch 10, the pin 24 will be in an intermediate part of the slot 23 so that the spring 21 can engage the dog 20 with a tooth 19 and as long as the parts remain in this position the brakes are held applied and the brakes will not be released until the parts are moved to a posititon where the pin 24 will exert a pull on the member 22 to release the dog. Of course, if the vehicles pick up sufficient speed to cause the governor to actuate the rod 8 then the collar 31 engaging the lever 28 will move the latch 20 out of engagement with a tooth on the part 16 which would permit the brakes to be released if the trailer is not crowding the vehicle. The parts are so constructed and arranged that the pin will engage the front end of the slot 23 to exert a pull upon the link 22 to release the dog 20 just as the latch 10 is entering the recess 12 and then the parts are held in position with the brakes released and this enables the motor vehicle to be backed which in turn, of course, backs the trailer.

When the vehicles are going down grade and the driver of the pulling vehicle wishes to stop and then back, the trailer would come to a stop in the forward position so that the latch 10 could not engage the recess 12. However, as the governor ceased to act on the rod 8 the spring 21 would place the latch 10 in engagement with one of the teeth 19 of the member 20, thus holding the trailer brakes applied and preventing further movement of the trailer. Then the driver could move forwardly the pulling vehicle a sufficient amount to let the latch 10 engage the recess 12 and this would cause the parts 22, 23, 24 and 25 to release the latch 20, thus freeing the brakes so that the driver can back both vehicles. If latch 20 was omitted there would be no way of keeping the brakes set when the pulling vehicle moves ahead so that the trailer would follow it and if an attempt was made to back the trailer brakes would be on and thus prevent the vehicles from being backed.

As it will be seen the governor acts to control the latch 10 and dog 20 keeping them from engaging when the trailer is moving over two or three miles per hour which lets the tongue free to apply the brakes whenever necessary.

It is thought from the foregoing description that the advantages and novel features of the invention will be readily apparent.

It is to be understood that changes may be made in the construction and in the combination, and arrangement of the several parts, provided that such changes fall within the scope of the appended claims.

Having described the invention, what is claimed as new is:—

1. Automatic brake control means for a trailer comprising a tongue slidably supported in the front part of the trailer and adapted to be connected to a towing vehicle, means for applying the brakes when the trailer moves forwardly relative to the tongue, latch means for latching the tongue to the trailer, governor means actuated by a movable part of the trailer for releasing the latch means.

2. Automatic brake control means for a trailer comprising a tongue slidably supported in the front part of the trailer and adapted to be connected to a towing vehicle, means for applying the brakes when the trailer moves forwardly relative to the tongue, latch means for latching the tongue to the trailer, governor means actuated by a movable part of the trailer for releasing the latch means, means for holding the brakes in applied position and means for releasing such holding means when the tongue moves forwardly relative to the trailer.

3. Automatic means for controlling the brakes of a trailer comprising a tongue slidably supported in the front part of the trailer and adapted to be connected to a towing vehicle, latch means for holding the tongue against movement in the trailer, governor means actuated from a movable part of the trailer for releasing the latch means, a member slidably supported in the trailer and connected with the brakes, a part on the member engaging the rear end of the tongue when the trailer moves toward the towing vehicle, ratchet means for holding the member in position with the brakes applied, said ratchet means including a spring pressed dog, a link connected with the dog and having a longitudinal slot therein, a member depending from the tongue and having a pin thereon passing through the slot, the pin moving the dog to releasing posititon upon forward movement of the tongue relative to the trailer.

4. Automatic brake control means for a trailer comprising a tongue slidably supported in the front part of the trailer and adapted to be connected to a towing vehicle, means for applying the brakes when the trailer moves forwardly relative to the tongue, latch means for latching the tongue to the trailer, means for holding the brakes in applied position and governor means actuated by a movable part of the trailer for releasing the latch means and the holding means when the trailer reaches a certain speed.

5. Automatic brake control means for a trailer comprising a tongue slidably supported in the front part of the trailer and adapted to be connected to a towing vehicle, means for applying the brakes when the trailer moves forwardly relative to the tongue, latch means for latching the tongue to the trailer, means for holding the brakes in applied position and governor means actuated by a movable part of the trailer for releasing the latch means and the holding means when the trailer reaches a certain speed, and means for holding the holding means in inoperative position when the latch means is in operative position.

WALTER DAVID STONG.